United States Patent [19]

Lock

[11] 4,048,868
[45] Sept. 20, 1977

[54] INTERRUPTED INTERMITTENT MOTION DEVICE

[76] Inventor: William E. Lock, 183 Wygant Road, Horseheads, N.Y. 14845

[21] Appl. No.: 697,664

[22] Filed: June 18, 1976

[51] Int. Cl.² .............................................. F16H 27/04
[52] U.S. Cl. .................................. 74/436; 214/8.5 A
[58] Field of Search .............. 74/436; 89/34; 198/858, 198/859; 214/8.5 A, 8.5 C

[56] References Cited

U.S. PATENT DOCUMENTS

| | | | |
|---|---|---|---|
| 3,546,958 | 12/1970 | Parks | 74/436 |
| 3,818,747 | 6/1974 | Riemsdijk | 74/436 |

*Primary Examiner*—Stephen C. Bentley
*Attorney, Agent, or Firm*—Joseph E. Rusz; Arsen Tashjian

[57] ABSTRACT

An intermittent motion device which converts input continuous motion into precisely timed output interrupted intermittent motion. In a generic preferred embodiment the device comprises a primary driver and a secondary driver that are attached to an input shaft, and a two-sided indexing driven wheel attached to an output shaft. The primary driver engages one of four drive slots on the primary side of the driven wheel, and rotates the driven wheel 72° each time the input shaft makes one revolution. The secondary driver engages the one slot on the secondary side of the driven wheel, and rotates the driven wheel 72° every fourth revolution of the input shaft. The indexing driven wheel is locked in a stationary dwell position between indexes by locking rollers on the driven wheel that engage in locking grooves in the primary and secondary driver wheels. Unlike the prior art this device is compact, eliminates intermediate drive shafts, and the novel two-sided structure of the indexing driven wheel makes a great variety of resultant output motions possible.

2 Claims, 5 Drawing Figures

INTERRUPTED INTERMITTENT MOTION DEVICE

STATEMENT OF GOVERNMENT INTEREST

The invention described herein may be manufactured and used by or for the Government for governmental purposes without the payment of any royalty thereon.

CROSS REFERENCE TO RELATED APPLICATION

The interrupted intermittent motion device taught herein may be used as a cooperating component in the inventive system set forth in my copending patent application entitled, "Automated Ammunition Loading/Downloading System", filed on even date herewith and having U.S. Pat. application Ser. No. 697,662.

BACKGROUND OF THE INVENTION

This invention relates to an interrupted intermittent motion device and, more particularly, to a geneva type drive (which includes a novel two-sided indexing driven wheel) adapted for use in providing positive movement and precise positioning, as well as a positive locked dwell of drive chains of a vertical conveyor for sequential removal of rows of ammunition from ammunition containers.

One particular application of such an adaptation of my interrupted intermittent motion device is illustrated in my copending patent application entitled, "Automated Ammunition Loading/Downloading System", filed on even date herewith.

This invention permits the indexing of boxes or containers of ammunition past an extraction table, one row at a time, in a cyclic manner; and, it also permits the holding of the boxes in a no-motion dwell position for extraction of the rounds of ammunition in each row, before indexing to the next row.

Therefore, I have significantly advanced the state of the art.

SUMMARY OF THE INVENTION

This inventive interrupted intermittent motion device pertains to a particular preferred embodiment adapted for use in converting continuous rotary motion input to interrupted intermittent motion output, thereby permitting the preselected precise motion and positioning of drive chains of a vertical conveyor.

Accordingly, the principal object of this invention is to teach the structure of such a preferred embodiment of this device.

This principal object, as well as other related objects (such as teaching a two-sided indexing driven wheel), of this invention will become readily apparent after a consideration of the description of my invention, coupled with reference to the Figures of the drawings.

DESCRIPTION OF THE PREFERRED EMBODIMENT

Figure 1:
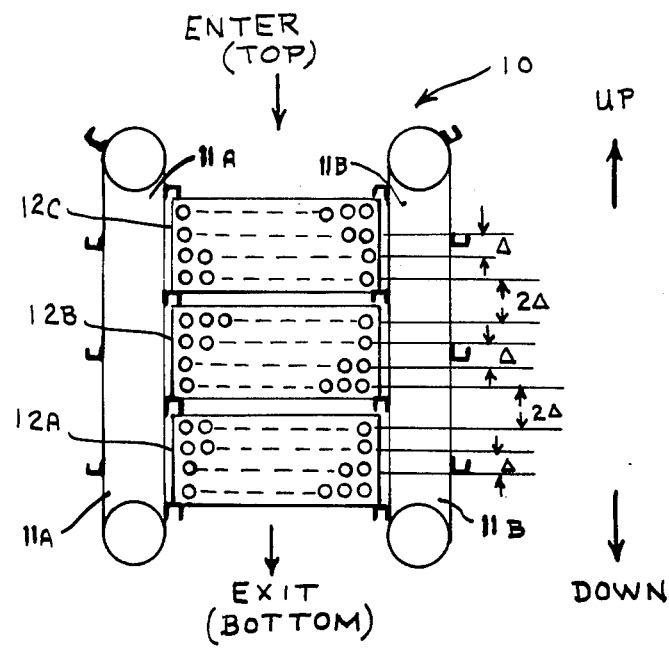
FIG. 1 is a front view, in simplified schematic form, of the environment in which the preferred embodiment of the inventive device will be used in cooperation with drive chains of a vertical conveyor; and, FIGS. 2-5, inclusive, are front views, in simplified pictorial form, of the preferred embodiment of the inventive device at different stages of its operation.
Figure 2:
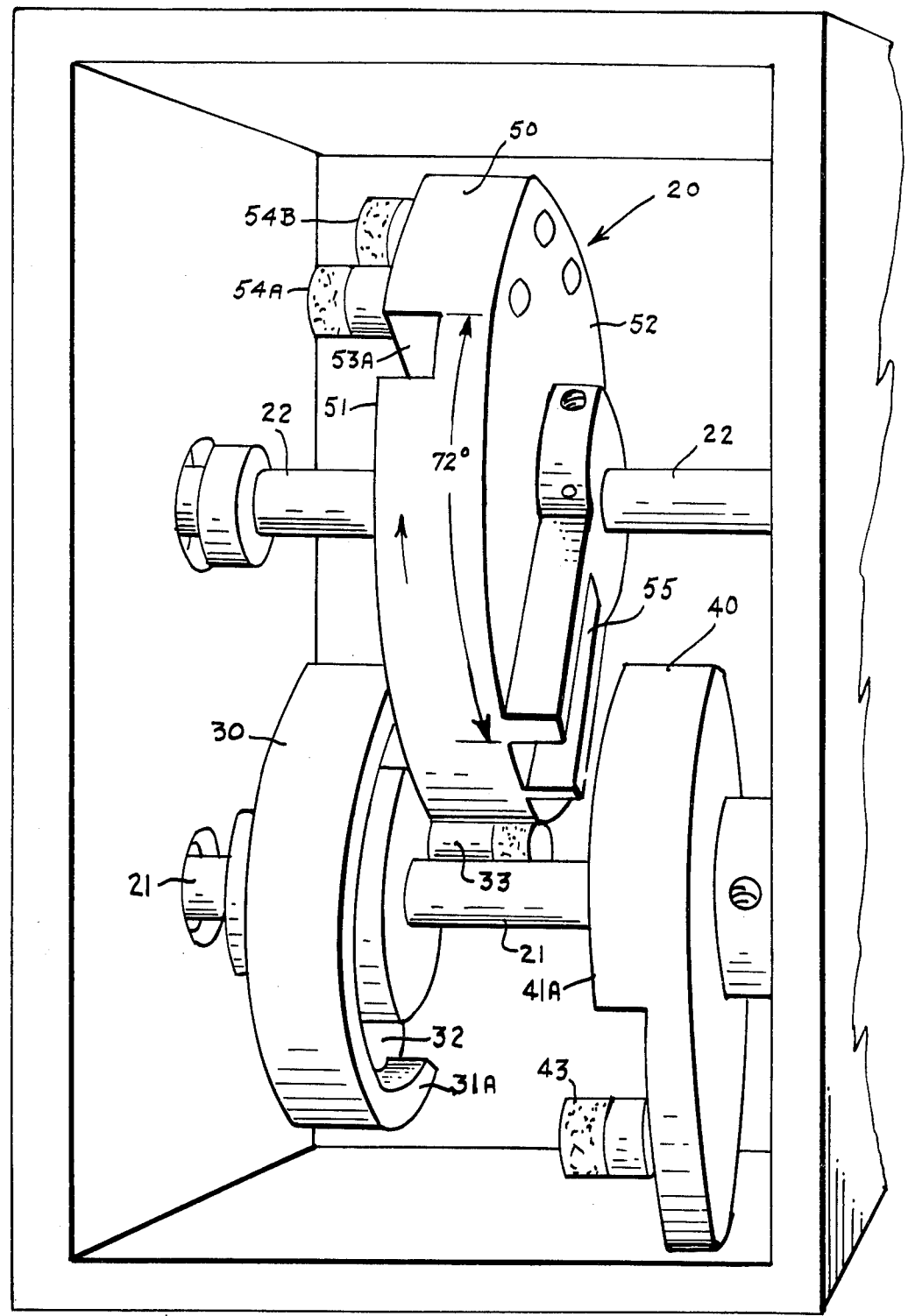

As a preliminary matter, reference is made to FIG. 1 which shows the comtemplated working environment for which the preferred embodiment was adapted.

In FIG. 1, a vertical conveyor, generally designated 10, is shown filled with plurality of partitioned ammunition shipping/storage boxes or containers, such as 12A, 12B and 12C, which are moved by drive chains 11A and 11B. The containers, which are filled with rounds of ammunition, enter at the top and exit at the bottom, as indicated by the legends and arrows; and, to better orient the reader the directional designations "Up" and "Down", together with their respective arrows, are also shown.

In conjunction with the operation of my invention, "Automated Ammunition Loading/Downloading System," which is taught in a copending patent application filed on even date herewith, it was desired to drive the vertical conveyor assembly 10 in a preselected precise, interrupted and intermittent cyclic manner.

More specifically, it was necessary to index a plurality of ammunition containers, such as 12A, 12B and 12C, past an extraction table (not shown, but perpendicular to the drawing) at the rate of one row of rounds of ammunition at a time in a cyclic manner; and, to hold the containers in a no-motion dwell position for extraction of the rounds in each row, before indexing to the next row. The spacing between adjoining rows in each box is a constant distance $\Delta$. The distance between the top row of a container and the bottom row of the container above that container is $2\Delta$, as shown in FIG. 1. This required that the cyclic indexing sequence move the containers the distance listed below:

| Row Index | Distance Moved |
| --- | --- |
| Bottom row to 2nd row | $\Delta$ |
| 2nd row to 3rd | $\Delta$ |
| 3rd row to top row | $\Delta$ |
| Top row to bottom row of container above | $2\Delta$ |

This sequence would then be repeated.

The interrupted intermittent motion device taught herein is intended to be mechanically geared to the conveyor sprockets to turn them the above-described incremental rotations.

With reference to FIGS. 2-5, inclusive, wherein the same reference numeral or character denotes the same element or the like, one can see that, in the most generic sense, the preferred embodiment 20 of my inventive interrupted intermittent motion device comprises: a rotatable input drive shaft 21; a primary driver wheel 30 disposed on or otherwise attached to the input drive shaft 21; a secondary drive wheel 40 also disposed on or otherwise attached to the input drive shaft 21; and, a two-sided indexing driven wheel 50 disposed on or otherwise attached to a rotatable output shaft 22.

The primary driver wheel 30 has an internal surface 31A, a locking groove 32 in the internal surface 31A, and a driver roller 33 connected to and protruding from the internal surface 31A.

The secondary driver wheel 40 has an internal surface 41A facing the internal surface 31A of the primary driver wheel 20, a locking groove 42 in the internal surface 41A, and a driver roller 43 connected to and protruding from the internal surface 41A.

The two-sided indexing driven wheel 50 has a first side surface 51 that is facing the internal surface 31A of the primary driver wheel 30, and a second side surface 52 that is facing the internal surface 41A of the secondary driver wheel 40.

The first side surface 51 of the driven wheel 50 has a plurality of drive slots therein, preferably four of them, such as 53A, 53B, 53C and 53D; and, said surface 51 also has connected thereto and protruding therefrom a plurality of locking rollers, preferably six of them, such as 54A, 54B, 54C, 54D, 54E and 54F.

The second side surface 52 of the driven wheel 50 has one drive slot 55 therein, and also has a plurality of locking rollers, preferably two of them, such as 56A and 56B, connected to and protruding from the second side surface 52.

Figure 3:
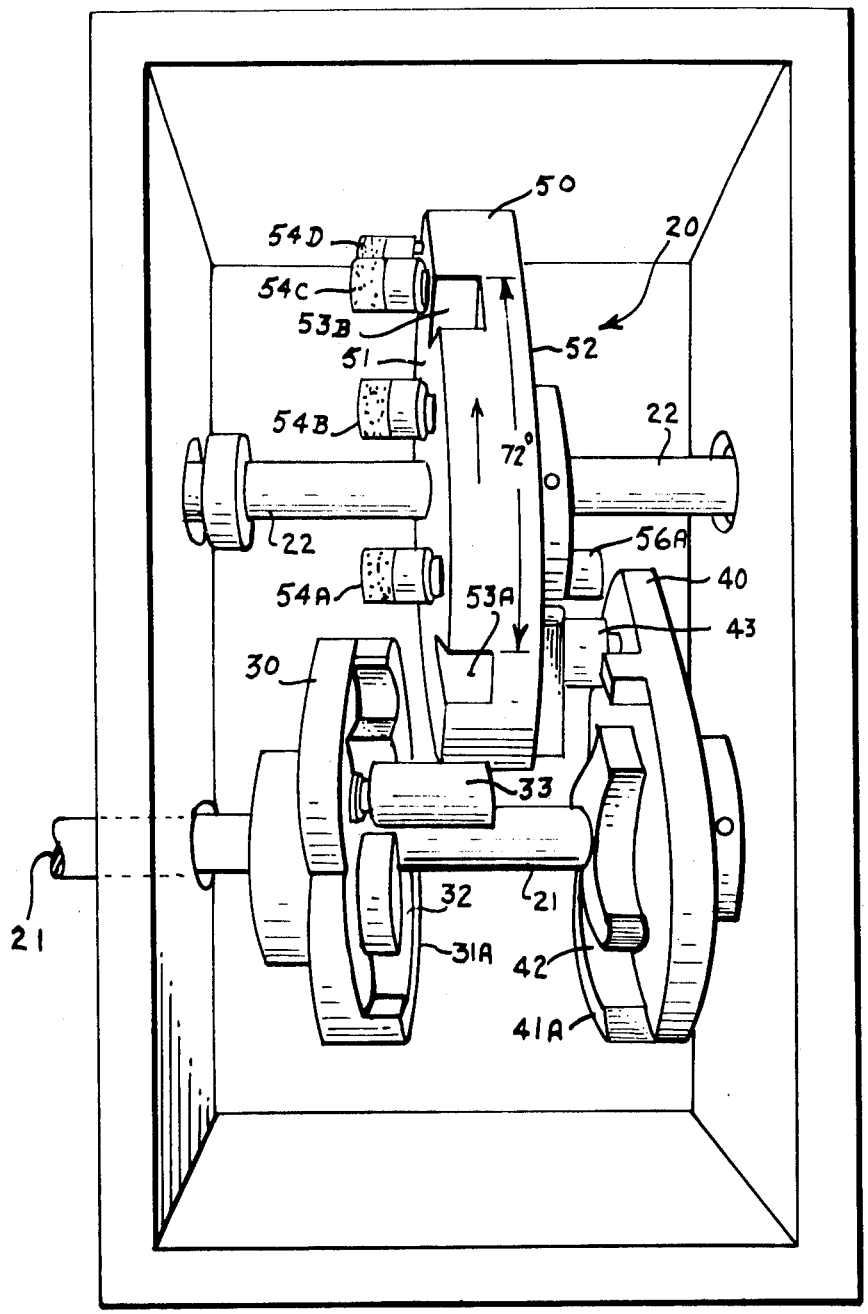
Figure 4:
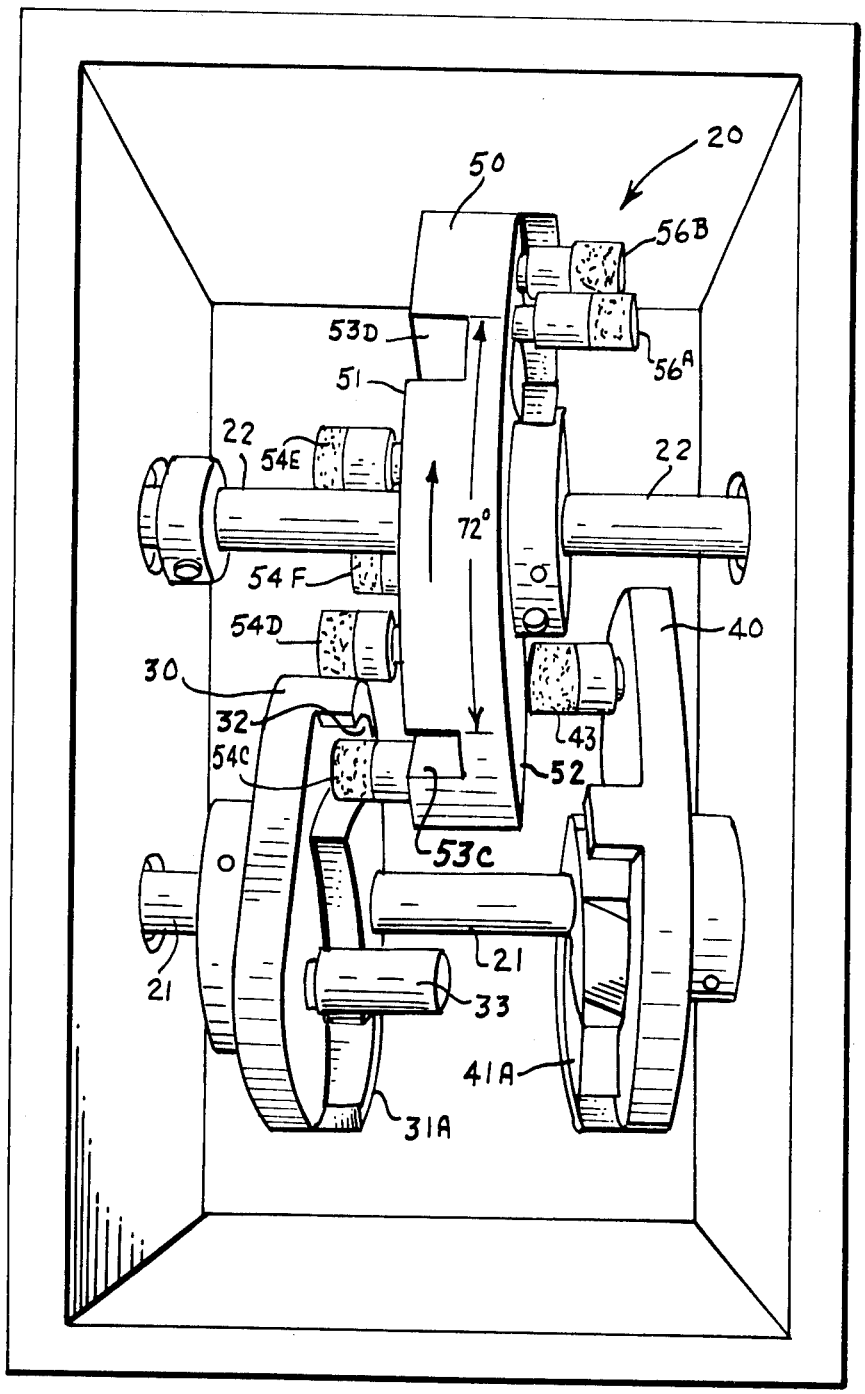
Figure 5:
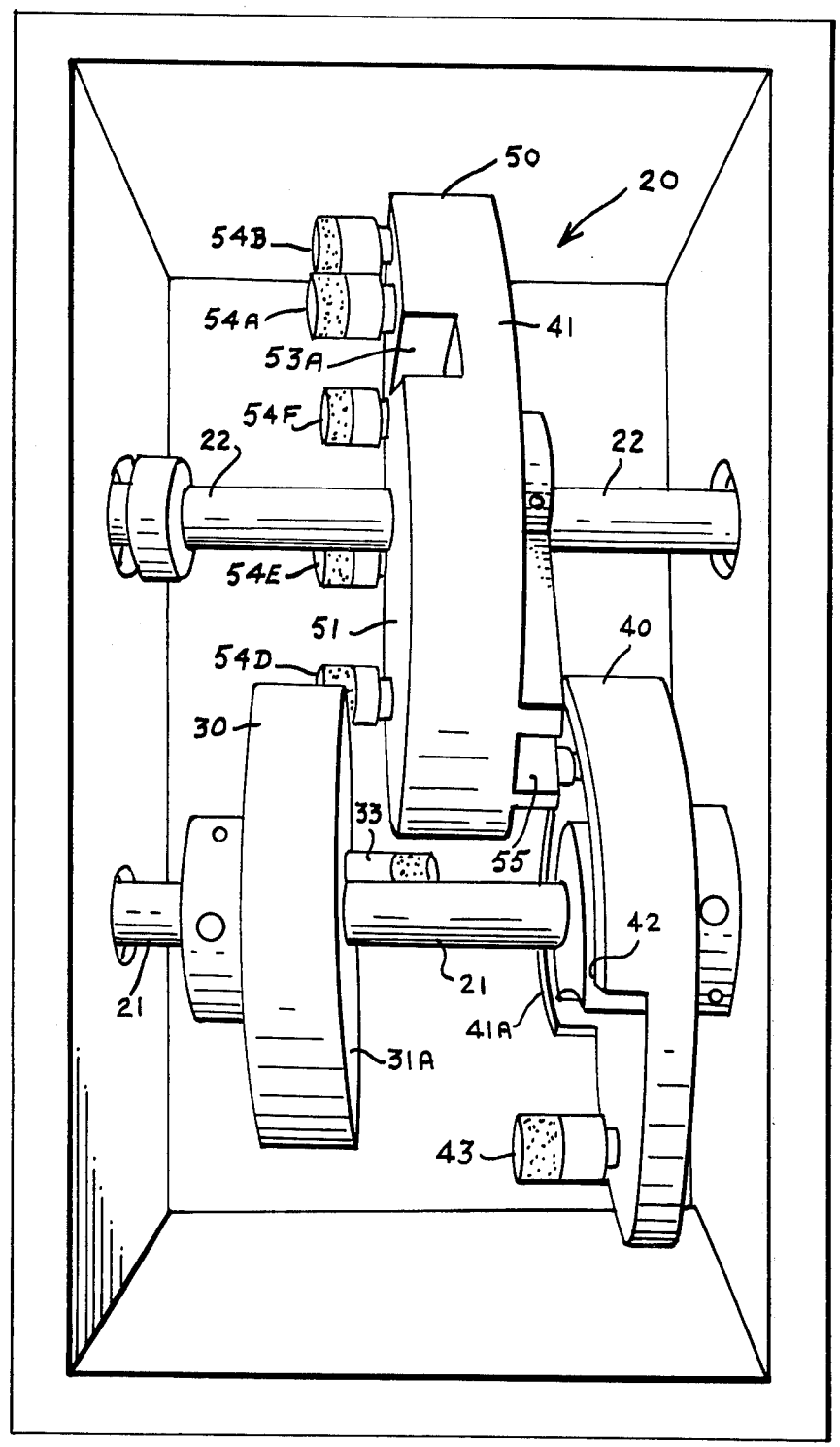

It is to be noted that each drive slot of the driven wheel 50 (i.e., 53A, 53B, 53D and 55) is 72° apart from each of the two adjacent drive slots (for example: drive slot 53C, FIG. 4, is 72 degrees away from drive slot 53D, FIG. 4, and also 72 degrees away from drive slot 53B, FIG. 3).

It is also to be noted that each drive slot (i.e., 53A, 53B and 53C) on the first side surface 51 of drive wheel 50 is dimensioned and configurated, individually and separately, to accept, engage with, and releasably hold the driver roller 33 of the primary driver wheel 30; and, that the drive slot 55 on the second side surface 52 of the driven wheel 50 is dimensioned and configurated to accept, engage with, and releasably hold the driver roller 43 of the secondary driver wheel 40.

It is further to be noted that the motion of the driven wheel 50 in FIGS. 2-5, inclusive, is as indicated by the directional arrow thereon.

MANNER OF OPERATION OF THE PREFERRED EMBODIMENT

The manner of operation of the preferred embodiment 20 of my inventive interrupted intermittent motion device can easily be ascertained by any person of ordinary skill in the art from the foregoing description, coupled with reference to the applicable Figures of the drawings.

For others, it is important to note in explanation that the inventive device 20 provides five indexing rotations (each of 72°) in an interrupted sequence for each four complete revolutions of the continuous motion input drive shaft 21. Stated another way, a double index (i.e., 144° rotation of the indexing driven wheel 50) results every fourth revolution of the continuous motion drive shaft 21. All other revolutions of the drive shaft 21 result in single indexes (i.e., 72° rotation of the indexing driven wheel 50). The motion is cyclic every four revolutions of the input shaft 21 (i.e., 72° index; 72° index; 72° index; 144° index; and, repeat the cycle). The driven wheel 50 is securely locked in position between indexes by the locking rollers 54A-54F.

More particularly, the primary driver 30 engages one of the four drive slots (i.e., 53A-53D) on the primary side (i.e., the first side surface) 51 of the driven wheel 50 and rotates the driven wheel 50 72° each time that the input shaft 21 makes one revolution. The secondary driver 40 engages the one slot 55 on the secondary side (i.e., the second side surface) 52 of the driven wheel 50 and rotates the driven wheel 50 72° every fourth revolution of the input shaft 21.

The resultant output motion of the driven wheel 50 (and, of course, of output shaft 22) is cyclic, as follows:

| INPUT SHAFT 21 | OUTPUT SHAFT 22 |
|---|---|
| 1st Rotation (108 degree motion, 252 degree dwell) | 72 degree rotation |
| 2nd Rotation (108 degree motion, 252 degree dwell) | 72 degree rotation |
| 3rd Rotation (108 degree motion, 252 degree dwell) | 72 degree rotation |
| 4th Rotation (216 degree motion, 144 degree dwell) | 144 degree rotation |

As previously indicated, the indexing driven wheel 50 is locked in a stationary dwell position between indexes by its locking rollers (i.e., 56A-56F) which engage in locking grooves in the drivers (i.e., groove 32 in driver 30, and groove 42 in driver 40).

CONCLUSION

It is very clear from all of the foregoing, and from the contents of the Figures of the drawings herein, that the stated principal object, as well as other related objects, of my invention have been attained.

It is to be noted that, although there have been described the fundamental and unique features of my inventive interrupted intermittent motion device as applied to a particular preferred embodiment that is adapted for a specific use, various other embodiments, adaptations, substitutions, additions, omissions, and the like may occur to, and may be made by, those of ordinary skill in the art, without departing from the spirit of my invention. For example, a great variety of resultant output motions are possible, using the two-sided driven wheel 50 concept, by utilizing different combinations of drive slots and locking rollers, and even using drivers with more than one drive roller.

What is claimed is:

1. An interrupted intermittent motion device, comprising:
   a. a rotatable input drive shaft;
   b. a primary driver wheel disposed on said input drive shaft, with said primary driver wheel having an internal surface, a locking groove in said internal surface, and a driver roller connected to and protruding from said internal surface;
   c. a secondary driver wheel disposed on said input drive shaft, with said secondary driver wheel having an internal surface facing said internal surface of said primary driver wheel, a locking groove in said internal surface, and a driver roller connected to and protruding from said internal surface;
   d. a two-sided indexing driven wheel having:
      1 a first side surface facing said internal surface of said primary driver wheel, with said first side surface having four adjacent and circumferentially-spaced drive slots therein which are dimensioned and configurated, individually and separately, to accept, engage with, and releasably hold said driver roller of said primary driver wheel, and with said first side surface also having six locking rollers connected to and protruding from said first side surface;
      2 and, a second side surface facing said internal surface of said secondary driver wheel, with said second side surface having one drive slot therein dimensioned and configurated to accept, engage with, and releasably hold said driver roller of said secondary driver wheel, and with said second side surface also having two locking rollers connected to and protruding from said second side surface;

e. and, a rotatable output shaft on which is disposed said two-sided indexing driven wheel.

2. An interrupted intermittent motion device, as set forth in claim 1, wherein:

a. said four adjacent and circumferentially-spaced drive slots on said first side surface of said two-sided indexing driven wheel are each separated from adjacent drive slots by an angular measurement of 72°;

b. and, said one drive slot on said second side surface of said two-sided indexing driven wheel is separated by adjacent drive slots on said first side surface of said two-sided indexing driven wheel by an angular measurement of 72°.

* * * * *